(No Model.)

A. PALM.
VEHICLE WHEEL.

No. 580,216. Patented Apr. 6, 1897.

Witnesses:
Geo. W. Young
N. E. Oliphant

Inventor
Anton Palm.
By H. G. Underwood
Attorneys

THE NORRIS PETERS CO., PHOTO-LITHO., WASHINGTON, D. C.

UNITED STATES PATENT OFFICE.

ANTON PALM, OF MILWAUKEE, WISCONSIN.

VEHICLE-WHEEL.

SPECIFICATION forming part of Letters Patent No. 580,216, dated April 6, 1897.

Application filed February 8, 1897. Serial No. 622,503. (No model.)

*To all whom it may concern:*

Be it known that I, ANTON PALM, a citizen of the United States, and a resident of Milwaukee, in the county of Milwaukee and State of Wisconsin, have invented certain new and useful Improvements in Vehicle-Wheels; and I do hereby declare that the following is a full, clear, and exact description thereof.

My invention has for its object to provide a simple, economical, and elastic vehicle-wheel designed for the purpose of readily absorbing vibration incidental to shock caused by contact of the rim with roadway obstructions; and it consists in certain peculiarities of construction and combination of parts hereinafter set forth with reference to the accompanying drawings and subsequently claimed.

Figure 1:
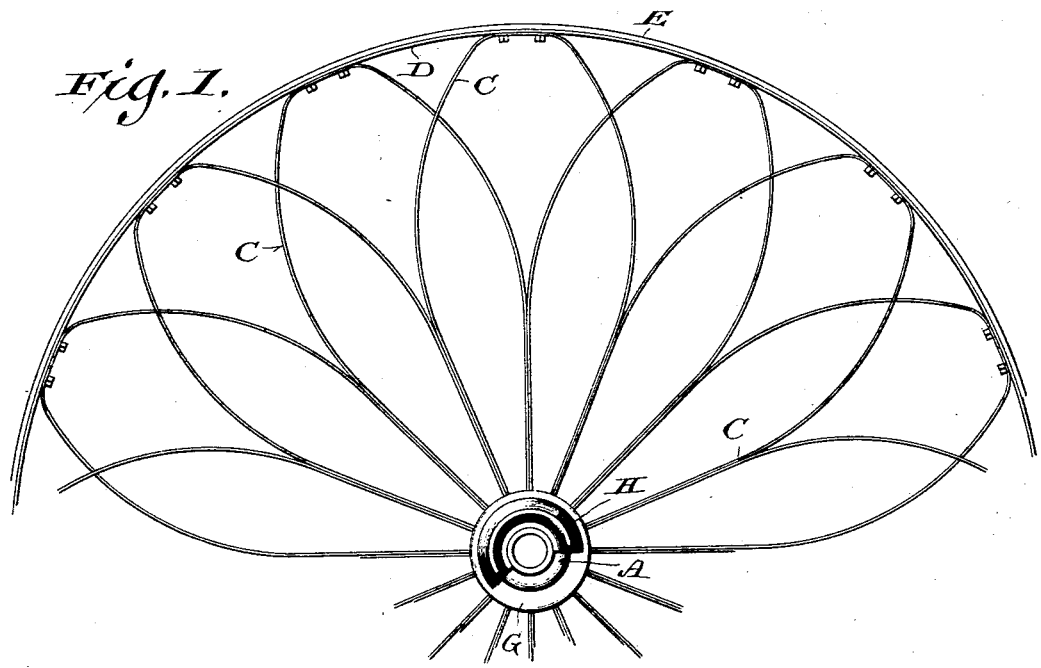
Figure 5:
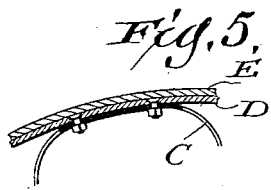
Figure 4:
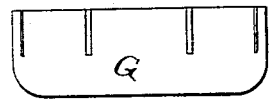
Figure 6:
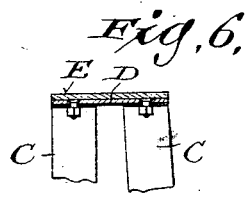
Figure 2:
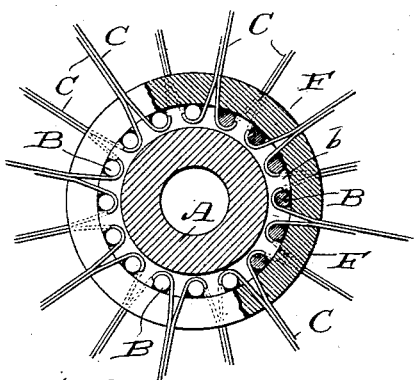
Figure 3:
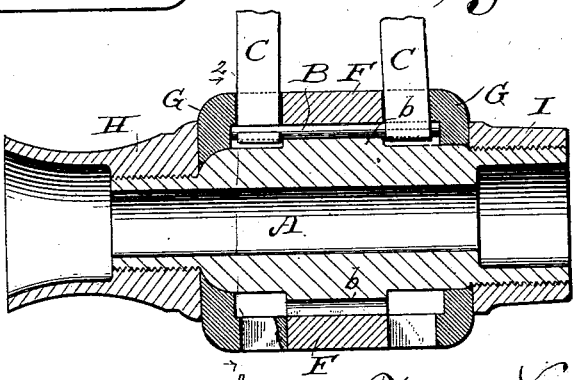

Figure 1 of the drawings represents a side elevation of a portion of a vehicle-wheel constructed according to my invention; Fig. 2, a detail view, partly in section, as indicated by line 2 2 in Fig. 3; Fig. 3, a longitudinal section illustrating the hub portion of the wheel; Fig. 4, a plan view of one of two notched shells embodied in said hub portion of the wheel; Fig. 5, a detail sectional view longitudinally of the wheel-rim, and Fig. 6 a similar view on a plane transverse of said rim.

Referring by letter to the drawings, A represents the hub axle-box of my improved vehicle-wheel, this box being exteriorly reduced to leave an annular collar $b$ intermediate of its ends, this collar being provided at regular intervals with a series of transverse peripheral seats for metallic stay-pins B, that extend in opposite directions from the collar longitudinally of the axle-box.

The ends of the stay-pins engage correspondingly-bent ends of preferably flat spring-metal bows C, that have their bends bolted or otherwise rigidly secured to a band-iron ring D, that of itself may constitute the wheel-rim, although a tire E is herein shown as part of said rim.

It is preferable to have the bent ends of each spring-metal bow converge toward each other and engage two of the stay-pins, one next the other, the bows on one side of the axle-box collar $b$ breaking joints with those at the other side of said collar in order to obtain the best results and improve the appearance of said wheel.

In the make-up of the wheel herein shown sixteen stay-pins are employed and there are an equal number of the spring-metal bows, eight on each side of the axle-box collar $b$, these bows being the equivalent of thirty-two spokes.

A ring F is herein shown slipped on the axle-box collar $b$ against the stay-pins B, although it may be found practical to form said collar and ring in one piece with the axle-box, due provision being had for seating of the stay-pins.

Annular shells G are slipped on the axle-box to have their rims come snug against the metal outward from the stay-pins, these shells being provided with rim-notches that accommodate the adjacent portions of the bows C, there being as many notches in each shell as there are bows on the corresponding side of the wheel.

The shells G are held to place by means of annular nuts H I, run on the exteriorly-screw-threaded ends of the axle-box, the nut H being herein shown as having an outwardly-extended portion of increased smooth bore constituting an axle-nut housing.

While the wheel is sufficiently stiff under ordinary circumstances, it will yield to roadway obstructions and absorb the vibrations that would otherwise come upon the remainder of the vehicle of which it may form a part.

Having thus described my invention, what I claim as new, and desire to secure by Letters Patent, is—

1. A vehicle-wheel comprising an axle-box having an annular exterior enlargement intermediate of its ends, stay-pins retained in the axle-box enlargement to extend therefrom in opposite directions, spring-metal bows having bent ends engaged with the stay-pins, rim-notched shells in slip engagement with the axle-box to come snug against the enlargement thereof and accommodate adjacent portions of the bows, nuts run on said axle-box to maintain the shells in position, and a rim in rigid connection with the bends of said bows.

2. A vehicle-wheel comprising an axle-box having an annular enlargement intermediate of its ends provided with a series of transverse peripheral seats, a corresponding series of stay-pins arranged in the seats to extend therefrom in opposite directions, a ring in slip engagement with the axle-box enlargement against the stay-pins, spring-metal bows having bent ends engaged with the stay-pins, rim-notched shells in slip engagement with the axle-box to come against the ring-encircled enlargement thereof and accommodate adjacent portions of said bows, nuts run on said axle-box to maintain the shells in position, and a rim in rigid connection with the bends of said bows.

3. A vehicle-wheel comprising an axle-box having an annular exterior enlargement intermediate of its ends, stay-pins retained in the axle-box enlargement to extend therefrom in opposite directions, spring-metal bows each of which has bent ends that converge toward each other and engage with two stay-pins one next the other, the bows on one side of the wheel breaking joints with those of the other side, rim-notched shells in slip engagement with the axle-box to come snug against the enlargement thereof and accommodate adjacent portions of said bows, nuts run on said axle-box to maintain the shells in position, and a rim in rigid connection with the bends of the bows.

In testimony that I claim the foregoing I have hereunto set my hand, at Milwaukee, in the county of Milwaukee and State of Wisconsin, in the presence of two witnesses.

ANTON PALM.

Witnesses:
N. E. OLIPHANT,
B. C. ROLOFF.